United States Patent
Yang et al.

(10) Patent No.: US 11,085,860 B2
(45) Date of Patent: Aug. 10, 2021

(54) SEALING PRESSING HEAD FOR CONVENTIONAL TRIAXIAL TEST OF CUBOID ROCKS WITH PRE-EXISTING FISSURES, AND TEST METHOD

(71) Applicant: CHINA UNIVERSITY OF MINING AND TECHNOLOGY, Xuzhou (CN)

(72) Inventors: Shengqi Yang, Xuzhou (CN); Wenling Tian, Xuzhou (CN); Pengfei Yin, Xuzhou (CN); Xiangru Liu, Xuzhou (CN); Sen Wen, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 78 days.

(21) Appl. No.: 16/617,486

(22) PCT Filed: Mar. 20, 2018

(86) PCT No.: PCT/CN2018/079590
§ 371 (c)(1),
(2) Date: Nov. 26, 2019

(87) PCT Pub. No.: WO2019/080441
PCT Pub. Date: May 2, 2019

(65) Prior Publication Data
US 2020/0182760 A1    Jun. 11, 2020

(30) Foreign Application Priority Data
Oct. 23, 2017 (CN) .......................... 201710992379.2

(51) Int. Cl.
*G01N 3/08* (2006.01)
*G01N 3/12* (2006.01)
*G01N 3/02* (2006.01)

(52) U.S. Cl.
CPC ............... *G01N 3/12* (2013.01); *G01N 3/02* (2013.01); *G01N 2203/0019* (2013.01); *G01N 2203/0048* (2013.01)

(58) Field of Classification Search
CPC ........... G01N 1/286; G01N 2203/0048; G01N 2203/0226; G01N 1/28; G01N 1/44;
(Continued)

(56) References Cited

U.S. PATENT DOCUMENTS

| | | | |
|---|---|---|---|
| 7,536,921 B1 * | 5/2009 | Chu | G01N 3/10 73/760 |
| 8,453,510 B2 * | 6/2013 | Chancellor | G01N 33/24 73/632 |
| 2015/0267370 A1 * | 9/2015 | Gupta | E02D 1/027 73/818 |

FOREIGN PATENT DOCUMENTS

| | | |
|---|---|---|
| CN | 102353853 A | 2/2012 |
| CN | 104677815 A | 6/2015 |

(Continued)

OTHER PUBLICATIONS

English Translation of International Search Report corresponding to International Patent Application No. PCT/CN2018/079590 dated Jun. 6, 2018.

*Primary Examiner* — Brandi N Hopkins
(74) *Attorney, Agent, or Firm* — Jenkins, Wilson, Taylor & Hunt, P.A.

(57) ABSTRACT

A sealing pressing head for a conventional triaxial test of cuboid rocks with pre-existing fissures, and a test method, the sealing pressing head comprising an upper pressing head (14) and a lower pressing head (15); the upper pressing head (14) and the lower pressing head (15) are respectively used for being provided at upper and lower ends of a test sample (10); the upper pressing head (14) comprises a circular portion (2) and a square portion (1) which are provided in (Continued)

sequence from top to bottom; and the lower pressing head (15) comprises a square portion (1), a circular portion (2) and a threaded portion (3) which are provided in sequence from top to bottom.

6 Claims, 2 Drawing Sheets

(58) Field of Classification Search
CPC .... G01N 3/08; G01N 2203/0256; G01N 3/02; G01N 3/12; G01N 2203/0019
See application file for complete search history.

(56) References Cited

FOREIGN PATENT DOCUMENTS

| | | |
|---|---|---|
| CN | 204831935 U | 12/2015 |
| CN | 106289996 A | 1/2017 |
| CN | 107741364 A | 2/2018 |
| CN | 107764631 A | 3/2018 |
| JP | 3781723 B2 | 5/2006 |

\* cited by examiner

SEALING PRESSING HEAD FOR CONVENTIONAL TRIAXIAL TEST OF CUBOID ROCKS WITH PRE-EXISTING FISSURES, AND TEST METHOD

I. TECHNICAL FIELD

The present invention relates to the field of experimental study on mechanical behaviors of fracture failure of rock mass with pre-existing fissures, particularly to experimental study of fracture failure behaviors of rock mass with pre-existing fissures under tri-axial compression conditions.

II. BACKGROUND ART

At present, most of the studies in the field of tests of rock mass with pre-existing fissures are focused on the mechanical behaviors of rock mass with pre-existing fissures in uniaxial compression, while conventional tri-axial compression tests are seldom involved. Even if the mechanical behaviors of rock mass with pre-existing fissures in conventional tri-axial compression tests are involved, materials similar to rock are usually used in the tests instead of real rocks. Cylindrical samples are usually used in conventional tri-axial compression tests. However, on one hand, it is difficult to prepare cylindrical samples with pre-existing fissures; on the other hand, it is difficult to achieve sealing of the pressure chamber for testing fractured samples under oil pressure. In view of these problems, cuboid samples are used instead of cylindrical samples. On one hand, fissures can be performed in cuboid samples conveniently; on the other hand, sealing can be achieved more easily owing to the fact that the pre-existing fissures in the surfaces of a cuboid sample are in two-dimensional planes. Therefore, the present invention mainly solves the sealing problem of cuboid rock samples with pre-existing fissures in conventional tri-axial compression tests.

III. CONTENTS OF THE INVENTION

The object of the present invention is to provide a sealing pressing head for conventional tri-axial tests of cuboid rocks with pre-existing fissures and a test method in order to solve the sealing problem of cuboid rock samples with pre-existing fissures in conventional tri-axial compression tests.

To attain the object described above, the present invention employs the following technical scheme:

A sealing pressing head for conventional tri-axial tests of cuboid rocks with pre-existing fissures comprises an upper pressing head and a lower pressing head, and the upper pressing head and the lower pressing head are arranged at the upper end and the lower end of a sample respectively, wherein, the upper pressing head comprises a round portion and a square portion arranged from top to bottom sequentially, and the lower pressing head comprises a square portion, a round portion, and a threaded portion arranged from top to bottom sequentially.

A first seal ring is provided on the round portion, and two seal rings, i.e., a second seal ring and a third seal ring respectively, are provided on the square portion.

A first spatial chamfer is arranged at a position where the square portion contacts with the sample, a planar chamfer is arranged on the square portion between the two seal rings, and a second spatial chamfer is arranged at a position where the square portion is connected with the round portion.

A method for conventional tri-axial tests of cuboid rocks with pre-existing fissures comprises the following steps:

(1) bonding a steel plate to the pre-existing fissures of the cuboid sample with pre-existing fissures by means of hot-melt adhesive and covering the pre-existing fissures;

(2) fixing the lower pressing head to the base of a conventional tri-axial compression instrument via the threaded portion;

(3) placing the cuboid sample with pre-existing fissures bonded with the steel plate on the lower pressing head, and fixing an end of the sample to the lower pressing head with an adhesive tape;

(4) fixing the upper pressing head to the cuboid sample with pre-existing fissures with an adhesive tape;

(5) fitting a heat shrinkable tube over the fixed upper pressing head, the cuboid sample with pre-existing fissures, and the lower pressing head, and then heating the heat shrinkable tube with a hot-air blower, so that the heat shrinkable tube is tightly coupled to the upper pressing head, the lower pressing head, and the cuboid sample with pre-existing fissures;

(6) then, pushing the cuboid sample with pre-existing fissures into a confining pressure chamber, and performing a series of operations including oil filling, application of confining pressure, and application of axial pressure, so as to accomplish the conventional tri-axial compression test.

In step (3) and step (4), the adhesive tape is a heat-resistant adhesive tape.

In step (5), the heat shrinkable tube should be in an appropriate length to ensure that the heat shrinkable tube can seal the positions of the seal rings after it shrinks under heat.

Benefits: the sealing pressing head for conventional tri-axial tests of cuboid rocks with pre-existing fissures provided in the present invention comprises an upper pressing head and a lower pressing head, the upper pressing head and the lower pressing head are arranged at the upper end and the lower end of the sample respectively, wherein, the upper pressing head directly contacts with a pressing head in the pressure chamber at the upper end to transfer axial pressure. The round portions of the upper pressing head and the lower pressing head are mainly used for sealing and pressure transfer, and the square portions are mainly used to abut against square end faces of the rock sample to transfer uniform pressure; the edges and corners of the square portion of the pressing head are chamfered. Specifically, the portion where the seal rings are mounted is chamfered with a planar chamfer, while the round portion and the square portion are chamfered with a spatial chamfer. The purpose of using chamfers, on one hand, is to prevent the heat shrinkable tube from being broken by excessively sharp edges and corners of the square portion under a high hydrostatic pressure condition, and on the other hand, is to enable the seal rings to couple with the heat shrinkable tube well so as to attain an ideal sealing effect. Three layers of seal rings are mounted on the upper pressing head and the lower pressing head respectively, wherein two layers of seal rings are arranged on the square portion of the pressing head and one layer of seal ring is arranged on the round portion of the pressing head. Such a seal ring arrangement is utilized in view that the round portion of the pressing head ensures tight coupling between the seal rings and the pressing head and tight coupling between the seal rings and the heat shrinkable tube under oil pressure. The two layers of seal rings arranged on the square portion of the pressing head attain a secondary protection effect, i.e., they still attain a sealing effect even if the seal ring on the round portion of the pressing head fails to provide a sealing function. A large number of tests have proved that the sealing pressing head and the method provided in the present invention are simple and feasible, which attain a good sealing effect, and successfully realize conventional tri-axial compression of square rock samples.

IV. DESCRIPTION OF DRAWINGS

In the figures: 1—square portion; 2—round portion; 3—threaded portion; 4—first seal ring; 5—second seal ring; 6—third seal ring; 7—first spatial chamfer; 8—planar chamfer; 9—second spatial chamfer; 10—cuboid sample with pre-existing fissures; 11—adhesive tape; 12—steel plate; 13—fissures; 14—upper pressing head; 15—lower pressing head.

V. EMBODIMENTS

Hereunder the present invention will be further detailed, with reference to the accompanying drawings.

Figure 1:
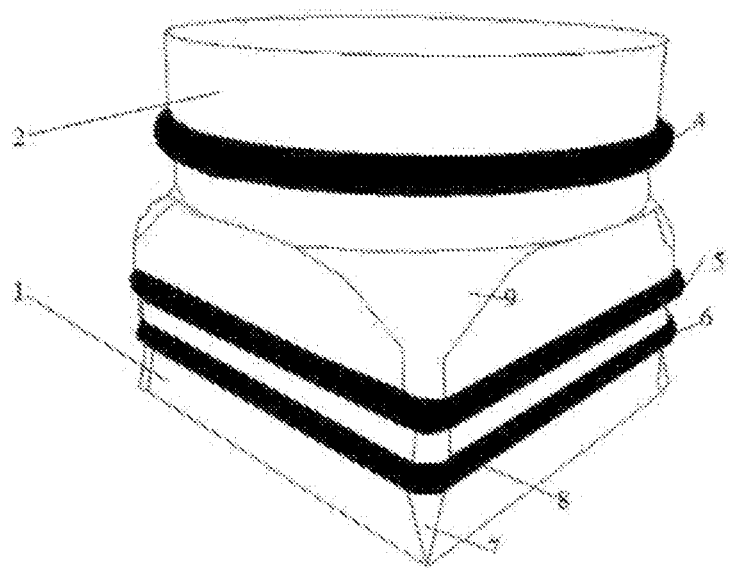
FIG. 1 is a schematic structural diagram of the upper pressing head of the sealing pressing head in the present invention.
Figure 2:
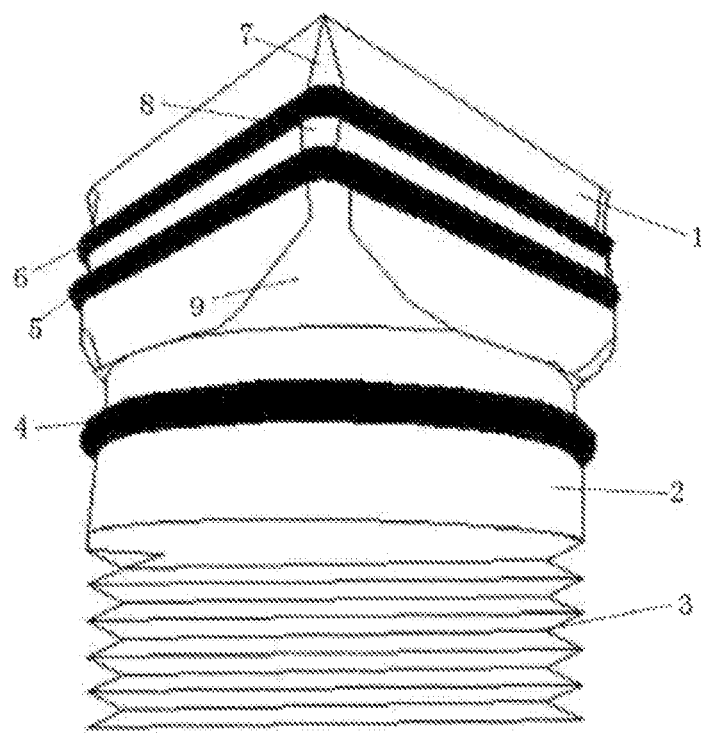
FIG. 2 is a schematic structural diagram of the lower pressing head of the sealing pressing head in the present invention.

As shown in FIGS. 1 and 2, a sealing pressing head for conventional tri-axial tests of cuboid rocks with pre-existing fissures comprises an upper pressing head and a lower pressing head, the upper pressing head and the lower pressing head are arranged at the upper end and the lower end of a sample respectively, wherein, the upper pressing head comprises a round portion 2 and a square portion 1 arranged from top to bottom sequentially. The square portion is mainly used to abut against a square end face of the rock sample so as to transfer uniform pressure, and the round portion serves as a transition between the square portion and the pressure chamber at the upper end and is mainly used to ensure sealing of the sample. The lower pressing head comprises a square portion 1, a round portion 2, and a threaded portion 3 arranged from top to bottom sequentially. The square portion is mainly used to abut against a square end face of the rock sample so as to transfer uniform pressure, the round portion serves as a transition between the square portion and the threaded portion and is mainly used to ensure sealing of the sample, and the threaded portion is mainly used to mount and fix the lower pressing head to the base of a conventional tri-axial compression instrument.

A first seal ring 4 mainly for sealing purpose is provided on the round portion 2. Two seal rings, i.e., a second seal ring 5 and a third seal ring 6 respectively, are provided on the square portion 1, and they are mainly used to block hydraulic oil intrusion in case that the first seal ring 4 fails to provide a sealing function, thereby improving overall leak tightness of the pressing heads. Such a seal ring arrangement is utilized in view that the round pressing head can ensure tight coupling between the seal rings and the pressing head and tight coupling between the seal rings and the heat shrinkable tube under oil pressure. The two layers of seal rings arranged on the square portion of the pressing head attain a secondary protection effect, i.e., they still attain a sealing effect even if the seal ring on the round portion of the pressing head fails to provide a sealing function.

A first spatial chamfer 7 is arranged at a position where the square portion 1 contacts with the sample. A planar chamfer 8 is arranged on the square portion 1 between the two seal rings, and a second spatial chamfer 9 is arranged at a position where the square portion 1 is connected with the round portion 2. The purpose of chamfering, on one hand, is to prevent the heat shrinkable tube from being broken by sharp edges and corners under a high hydrostatic pressure condition and consequent oil intrusion into the sample and test failure, on the other hand, is to ensure tight coupling between the heat shrinkable tube and three seal rings.

Figure 3:
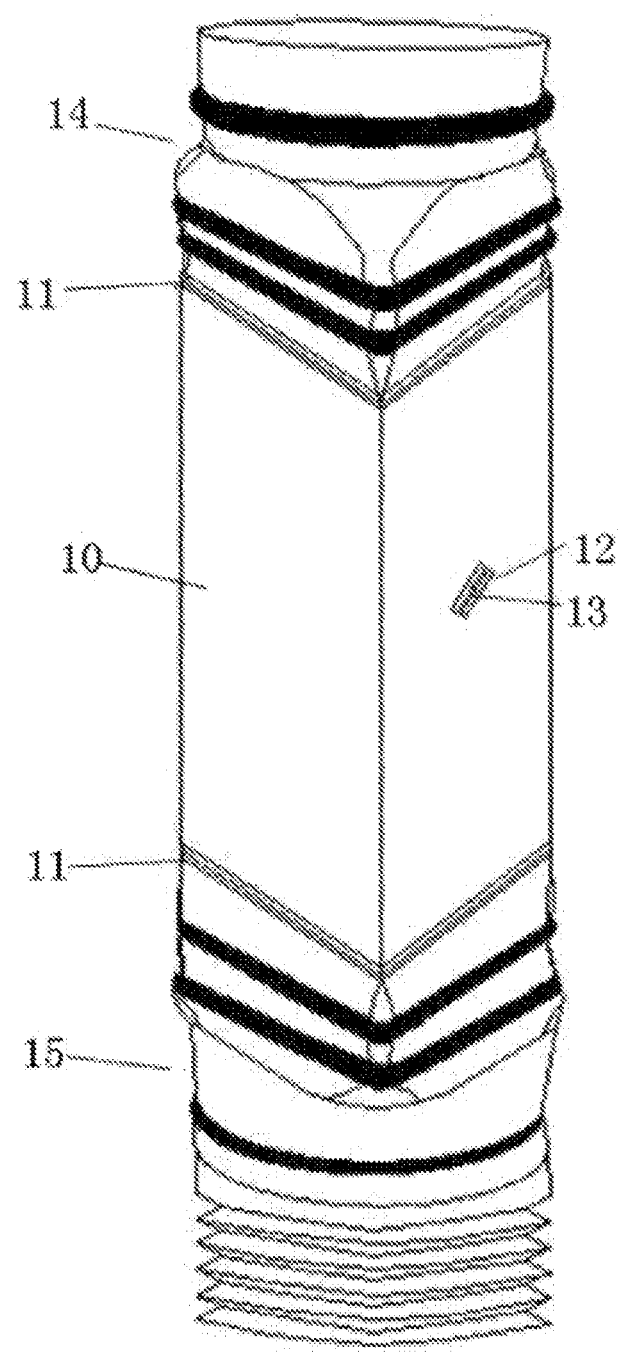
FIG. 3 is a schematic diagram of the sealing pressing head mounted on a cuboid sample with pre-existing fissures in the present invention.

A method for conventional tri-axial tests of cuboid rocks with pre-existing fissures with sealing pressing head utilizes the above-mentioned sealing pressing head for conventional tri-axial tests of cuboid rocks with pre-existing fissures, and utilizes a heat shrinkable tube and a steel plate to seal the cuboid rock sample with pre-existing fissures and thereby enables subsequent conventional tri-axial compression tests, specifically including the following steps:

(1) As shown in FIG. 3, a steel plate 12 is bonded to the pre-existing fissures 13 of a cuboid sample with pre-existing fissures 10 by means of hot-melt adhesive covering the pre-existing fissures 13, so as to prevent penetration of hydraulic oil through the heat shrinkable tube at the positions of the pre-existing fissures under a high hydrostatic pressure condition;

(2) The lower pressing head 15 is fixed to the base of a conventional tri-axial compression instrument via the threaded portion;

(3) The cuboid sample with pre-existing fissures 10 bonded with the steel plate 12 is placed on the lower pressing head 15, and an end of the sample is fixed to the lower pressing head 15 with an adhesive tape 11, wherein the adhesive tape is a heat-resistant adhesive tape; the purpose of fixing with an adhesive tape is to prevent the sample from dislocation in the process of shrinkage of the heat shrinkable tube, which may result in uneven stress in the subsequent compression process; in the fixing process, the lower pressing head is pressed by hand to make the lower pressing head contact closely with the sample; at this point, attention should be paid to ensure that the adhesive tape is not lower than the third seal ring 6 that is at the highest position among the three seal rings on the lower pressing head, otherwise the sealing effect of the seal rings will be compromised;

(4) The upper pressing head 14 is fixed to the cuboid sample with pre-existing fissures 10 using an adhesive tape 11; the adhesive tape is also a heat-resistant tape; and the purpose of fixing with an adhesive tape is also to prevent the sample from dislocation in the process of shrinkage of the heat shrinkable tube, which may result in uneven stress in the subsequent compression process; in the fixing process, the upper pressing head is pressed by hand to make the upper pressing head contact closely with the sample; at this point, attention should be paid to ensure that the adhesive tape is not higher than the third seal ring 6 that is at the lowest position among the three seal rings on the upper pressing head, otherwise the sealing effect of the seal rings will be compromised;

(5) A heat shrinkable tube is used to cover the fixed upper pressing head 14, the cuboid sample with pre-existing fissures 10, and the lower pressing head 15. The heat shrinkable tube is heated with a hot-air blower, so that the heat shrinkable tube is tightly coupled to the upper pressing head, the lower pressing head, and the cuboid sample with pre-existing fissures; at this point, attention should be paid to ensure that the heat shrinkable tube after the thermal shrinkage should exceed the first seal ring 4 on the round portion of the pressing head; otherwise the heat shrinkable tube must be sheared off and sealed again;

(6) Then, the cuboid sample with pre-existing fissures is pushed into a confining pressure chamber, and a series of operations, including oil filling, application of confining pressure, and application of axial pressure, are performed so as to accomplish the conventional tri-axial compression test.

While the present invention is described above in some preferred embodiments, it should be noted that those skilled in the art can make various improvements and modifications without departing from the principle of the present invention, and those improvements and modifications should be deemed as falling in the scope of protection of the present invention.

The invention claimed is:

1. A sealing pressing head for conventional tri-axial tests of cuboid rocks with pre-existing fissures, comprising an upper pressing head and a lower pressing head, the upper pressing head and the lower pressing head are arranged at the upper end and lower end of a sample respectively, wherein, the upper pressing head comprises a round portion and a square portion arranged from top to bottom sequentially, and the lower pressing head comprises a square portion, a round portion, and a threaded portion arranged from top to bottom sequentially.

2. The sealing pressing head for conventional tri-axial tests of cuboid rocks with pre-existing fissures according to claim 1, characterized in that, a first seal ring is provided on the round portion, and two seal rings, i.e., a second seal ring and a third seal ring respectively, are provided on the square portion.

3. The sealing pressing head for conventional tri-axial tests of cuboid rocks with pre-existing fissures according to claim 2, characterized in that, a first spatial chamfer is arranged at a position where the square portion contacts with the sample, a planar chamfer is arranged on the square portion between the two seal rings, and a second spatial chamfer is arranged at a position where the square portion is connected with the round portion.

4. A method for conventional tri-axial tests of cuboid rocks with pre-existing fissures based on the sealing pressing head according to claim 1, comprising the following steps:

(1) bonding a steel plate to the pre-existing fissures of the cuboid sample with pre-existing fissures by means of hot-melt adhesive and covering the pre-existing fissures;

(2) fixing the lower pressing head to the base of a conventional tri-axial compression instrument via the threaded portion;

(3) placing the cuboid sample with pre-existing fissures bonded with the steel plate on the lower pressing head, and fixing an end of the sample to the lower pressing head with an adhesive tape;

(4) fixing the upper pressing head to the cuboid sample with pre-existing fissures with an adhesive tape;

(5) fitting a heat shrinkable tube over the fixed upper pressing head, the cuboid sample with pre-existing fissures, and the lower pressing head, and then heating the heat shrinkable tube with a hot-air blower, so that the heat shrinkable tube is tightly coupled to the upper pressing head, the lower pressing head, and the cuboid sample with pre-existing fissures; and (6) then, pushing the cuboid sample with pre-existing fissures into a confining pressure chamber, and performing a series of operations including oil filling, application of confining pressure, and application of axial pressure, so as to accomplish the conventional tri-axial compression test.

5. The method for conventional tri-axial tests of cuboid rocks with pre-existing fissures according to claim 4, characterized in that, in step (3) and step (4), the adhesive tape is a heat-resistant adhesive tape.

6. The method for conventional tri-axial tests of cuboid rocks with pre-existing fissures according to claim 4, characterized in that, in step (5), the heat shrinkable tube should be in an appropriate length to ensure that the heat shrinkable tube can seal the positions of the seal rings after it shrinks under heat.

* * * * *